United States Patent [19]
Miyashita

[11] Patent Number: 5,363,240
[45] Date of Patent: Nov. 8, 1994

[54] IMAGE FORMING DEVICE AND METHOD FOR PRODUCING IT

[75] Inventor: Takaaki Miyashita, Yokohama, Japan

[73] Assignee: Ricoh Company, Ltd., Tokyo, Japan

[21] Appl. No.: 976,336

[22] Filed: Nov. 13, 1992

[51] Int. Cl.$^5$ .............................. G02B 27/10
[52] U.S. Cl. ..................... 359/625; 359/619; 359/627; 359/741
[58] Field of Search ............... 359/619, 741, 625, 627, 359/628

[56] References Cited

U.S. PATENT DOCUMENTS

| | | | |
|---|---|---|---|
| 5,035,486 | 7/1991 | Inokuchi | 359/619 |
| 5,150,259 | 9/1992 | Oishi | 359/619 |
| 5,168,401 | 12/1992 | Endriz | 359/619 |

*Primary Examiner*—Scott J. Sugarman
*Attorney, Agent, or Firm*—Oblon, Spivak, McClelland, Maier & Neustadt

[57] ABSTRACT

An image forming device is improved in that crosstalk between adjacent lenses is decreased thereby to improve an imaging power. In the image forming device a lens array has a plurality of lenses continuously formed. A roof prism array is also provided therein with a plurality of roof prisms respectively having a rectangular reflection plane and arranged at the same pitch as that of the lenses in the lens array. The lens array and the roof prism array are integrally formed of a plastic. A space portion, which is a portion unfilled with a resin, is formed between respective two adjacent roof prism lens pairs to prevent the crosstalk therebetween. Alternatively, a light shielding member may be integrally formed in front of the lens array to prevent the crosstalk.

19 Claims, 15 Drawing Sheets

LIGHT REFLECTED BY ONLY ONE PLANE OF RPA

Fig.25A
Fig.25B
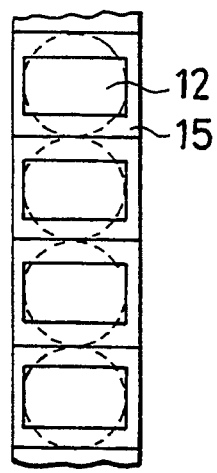
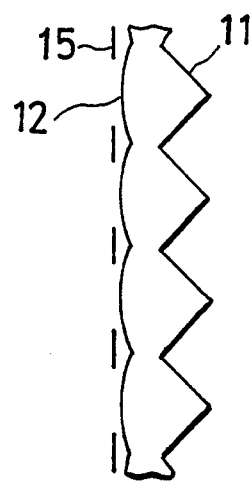
Fig.26
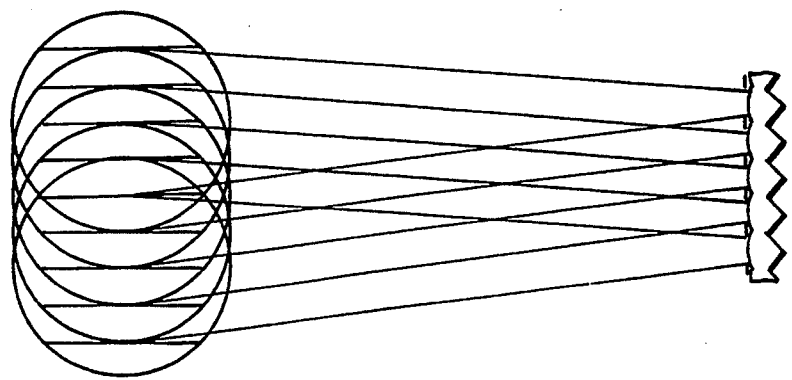

LIGHT REFLECTED BY ONLY ONE PLANE OF RPA

IMAGE FORMING DEVICE AND METHOD FOR PRODUCING IT

BACKGROUND OF THE INVENTION

1. Field of the Invention

The present invention relates to an image forming device and a method for producing it. Specifically, the invention relates to an image forming device applicable for example to an original document reader in a facsimile device or in an image scanner, to an image reader used in an optical printer or the like, and to a light source for a self-scanning type printer.

2. Description of the Related Art

An example of conventional techniques related to the present invention is described for example in Japanese Examined Patent Publication No. 61-2929. The example as described is explained in the following with the drawings as attached to the publication.

FIGS. 24A-24C are drawings to show a structure of the conventional roof mirror lens array (RMLA), in which FIG. 24A is a plan view thereof, FIG. 24B an elevational view thereof, and FIG. 24C a drawing to show an example of integral formation of prisms and lenses. In the drawings, reference numeral 10 designates a prism lens array, 11 a prism array, 12 a lens array, 13 an object, and 14 an inverted equal-size image.

Integrally formed of a plastic are the lens array (LA) 12 having a plurality of lenses continuously formed and the roof prism array (RPA) 11 having a plurality of roof prisms continuously formed at the same arrangement pitch as that of the lens array and each roof prism having a rectangular reflection plane.

An erecting real image is formed in the arrangement direction (Y direction) of the lens array (LA) 12 and the roof prism array (RPA) 10 and in the orthogonal direction thereto (X direction). Specifically, since an erecting equal-size image is formed in the Y direction, an image obtained through a single pair of the lens array (LA) 12 and the roof prism array (RPA) is overlapped on images through other pairs in the Y direction to cover a necessary width.

An opening shape of each lens is properly determined to make a light amount distribution even in the Y direction, whereby the light amount distribution may be optimized.

As described, the image forming device as described in Japanese Examined Patent Publication No. 61-2929 is integrally formed of a plastic material with the lens array having numerous small lenses aligned on a line and with the roof prism array having numerous rectangular prisms aligned behind the small lenses in such a state that each edge line of the rectangular reflection plane is made correspondent with a curvature center of each small lens. The image forming device has such a drawback, as shown in FIG. 24A, that light from a region having a large angle of view in the arrangement direction of the roof prism lens array (RPLA) is reflected only by a single plane of the reflection plane of the roof prism array (RPA) and reaches an image plane without forming an erecting image.

Further, since the edge line of the rectangular reflection plane is coincident with the curvature center of the small lens, there is another drawback that a degree of freedom is restricted to select the angle of view thereby to force a restriction on the properties such as the light amount distribution and the resolving power.

It is proposed as shown in FIGS. 25 to 27 to improve the light amount distribution by providing a light shielding mask 15 to limit the opening shape of the lenses in front of the lens array. However, in order to shield the light reflected only by a single plane of the reflection plane of the roof prism array (RPA), the opening shape of the mask must be extremely reduced or the lenses must be discretely disposed, which inevitably decreases the light utilization efficiency.

An "optical image forming device" as described in Japanese Unexamined Patent Publication No. 56-149002 is composed of an elongate prism lens array in which a plate prism array 23 having a plurality of prisms is coupled with a plate lens array 25 having a plurality of lenses. In detail, a plate light shielding member 27 is provided between the lens array 25 and the prism array 23 while defining an opening 26 for each lens element in the optical image forming device. However, since the lens array is superimposed on the prism array in the direction of the optical axis, an optical axis offset is likely to occur due to machining errors, which results in degrading the imaging power.

SUMMARY OF THE INVENTION

The present invention has been accomplished taking into account the above-described circumstances. It is an object of the present invention to provide an image forming device capable of reducing crosstalk between adjacent lenses and thereby improving the imaging power.

The object of the present invention can be achieved by an image forming device comprising: a lens array having a plurality of lenses continuously formed; a roof prism array having a plurality of roof prisms corresponding to the plurality of lenses in the lens array in one-to-one correspondence, each of the roof prisms having a rectangular reflection plane and defining a roof prism lens pair together with a corresponding lens; the lens array and the roof prism array being integrally formed of a plastic; and light shielding means disposed between respective two adjacent roof prism lens pairs to prevent crosstalk of light therebetween.

According to the above arrangement, the light shielding means reduces the crosstalk between adjacent lenses thereby to improve the imaging power of the image forming device.

In one embodiment of the present invention, the light shielding means may be a space portion provided between respective two adjacent roof prism lens pairs.

The space portion, which is a portion unfilled with a resin, disposed between respective two adjacent roof prism lens pairs can reduce the crosstalk between the lenses thereby to improve the imaging power.

In the above embodiment, a reflection film may be formed on a back of the reflection plane of the roof prism, the space portion may be defined between two planes each of which connects between a lens and a roof prism, and a light shielding film may be formed on the planes. This arrangement permits efficient prevention of crosstalk.

In another embodiment, a light shielding member may be provided in the space portion. The crosstalk may be reduced between adjacent lenses thereby to improve the imaging power in such a simple method that the space portion, which is a portion unfilled with a resin, is formed between respective two adjacent prism lens pairs and that the light shielding member is provided in the space.

In still another embodiment, the light shielding means is a light shielding member provided in front of the lens array and between the roof prism lens pairs. The light shielding member may be integrally formed together with the lens array and the roof prism array. The integral formation of the light shielding member in front of the lens array can reduce the crosstalk between adjacent lenses and can also prevent a positional deviation between the roof prism lens array (RPLA) and the light shielding member, whereby improving the imaging power.

In still another embodiment, the light shielding means is a light shielding member comprised of a light shielding plate portion fit into the space portion provided between respective two adjacent roof prism lens pairs and an aperture plate portion defining an opening shape of the lenses while connecting the light shielding plate portion. The light shielding member is integrally formed. The crosstalk may be reduced between adjacent lenses thereby to improve the imaging power by the integral formation of the light shielding plate portion fit into the space portion (resin-unfilled portion) between respective two adjacent roof prism lens pairs with the aperture portion in front of the lens array. Further, the light amount distribution may be optimized.

In still another embodiment, a light shielding member comprised of the light shielding plate portion and the aperture plate portion as described above is provided for each roof prism lens pair, independent of other light shielding members. Since each pair of the light shielding plate and the aperture plate is provided for each lens and each pair is integrally formed, an arrangement pitch of lens openings may be kept even thereby to prevent local fluctuations in light amount distribution, while absorbing a distribution of the entire length due to machining errors of the roof prism lens array (RPLA), and/or extension and contraction due to an environmental change. Further, in the above arrangement, two adjacent aperture plate portions are connected by male-female coupling. The male-female coupling of the aperture plates permits the light shielding members to slide to each other upon change in the entire length of the roof prism lens array (RPLA), so that the arrangement pitch of openings of the aperture plates may be kept even, and that light leakage may be prevented between the light shielding plate and the aperture plate.

Another object of the present invention is to provide a simple method for producing an image forming device with light shielding means having a stable light shielding property.

The object can be achieved by a method for producing an image forming device comprising a step of integrally forming an image forming device comprising a lens array, a roof prism array, and light shielding means, and a step of dipping the integrally-formed image forming device into a material for forming a light shielding film so as to form a light shielding film on the light shielding means.

By this method, the light shielding film may be simply formed on the light shielding means and the image forming device thus produced may have a stable imaging power.

In one embodiment of the method, the light shielding means of the image forming device may be formed as a spacing portion between respective two adjacent roof prism lens pairs, and the integrally-formed image forming device may be dipped into the light shielding film forming material on a side of the roof prism array.

In another embodiment of the method, the light shielding means of the image forming device may be formed as a light shielding member in front of the lens array and between the roof prism lens pairs, and the light shielding member of the integrally-formed image forming device may be dipped into the light shielding film forming material.

In these embodiments, the light shielding material may be formed in a simple manner onto the light shielding member integral with the roof prism lens array (RPLA), whereby stabilizing the imaging power.

Further, a vent portion may be provided in the light shielding member. The light shielding material may be stably formed on the light shielding member in dip coating by forming the vent portion in the light shielding member integral with the roof prism lens array (RPLA).

Further objects and advantages of the present invention will be apparent from the following description of the preferred embodiments of the invention as illustrated in the accompanying drawings.

BRIEF DESCRIPTION OF THE DRAWINGS

FIG. 3A and FIG. 3B are drawings to show a modification of the first embodiment as shown in FIG. 1, in which FIG. 3A is a plan view thereof and FIG. 3B is a cross-sectional side view thereof;

FIG. 4A, FIG. 4B, and FIG. 4C are drawings to show another modification of the first embodiment as shown in FIG. 1, in which FIG. 4A is a plan view thereof, FIG. 4B is a cross-sectional view along I—I line in FIG. 4A, and FIG. 4C a cross-sectional view along II—II line in FIG. 4A;

FIG. 6A and FIG. 6B are drawings to show a third embodiment of the image forming device according to the present invention, in which FIG. 6A is a plan view thereof and FIG. 6B is a cross-sectional side view thereof;

FIG. 13A and FIG. 13B are drawings to show a modification of the fourth embodiment as shown in FIG. 11, in which FIG. 13A is a cross-sectional side view thereof and FIG. 13B is a plan view thereof;

FIG. 24A, FIG. 24B, and FIG. 24C are drawings to show a structure of a conventional roof mirror lens array, in which FIG. 24A is a plan view thereof, FIG. 24B an elevational view thereof, and FIG. 24C an example of integral formation of prism and lens;

FIG. 25A and FIG. 25B are drawings to show another example of a conventional prism lens array;

FIG. 26 is a drawing to show an overlap degree differing depending upon a prism opening shape;

DESCRIPTION OF THE PREFERRED EMBODIMENTS

Preferred embodiments of the present invention are explained in the following with reference to the accompanying drawings.

First explained with FIGS. 1–10 are embodiments in which a space portion is provided as light shielding means between roof prism lenses.

Figure 1:
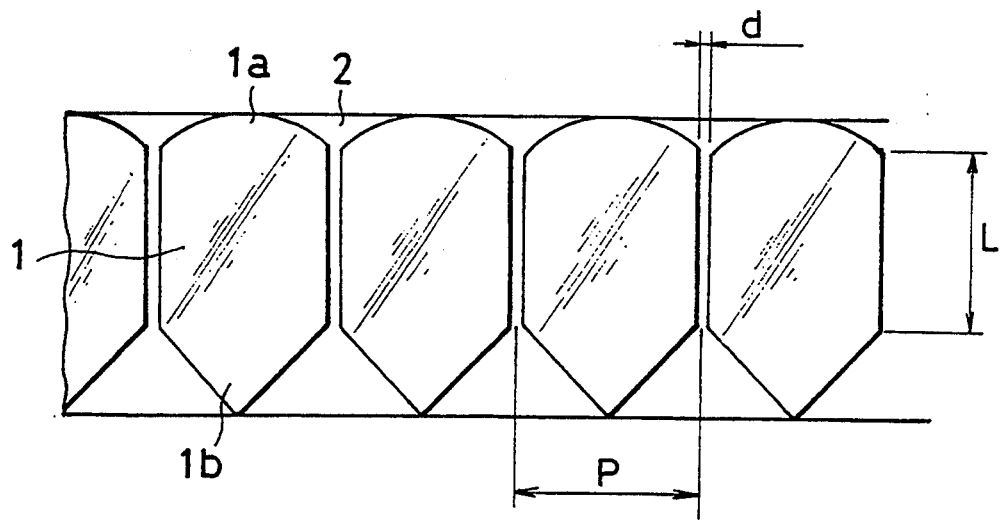
FIG. 1 is a constitutional drawing to illustrate a first embodiment of an image forming device according to the present invention.
Figure 2A:
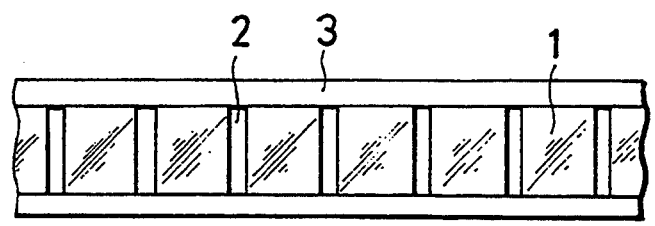
FIG. 2A and FIG. 2B are drawings to show a plan view and a cross-sectional side view of the image forming device as shown in FIG. 1, respectively.
Figure 2B:
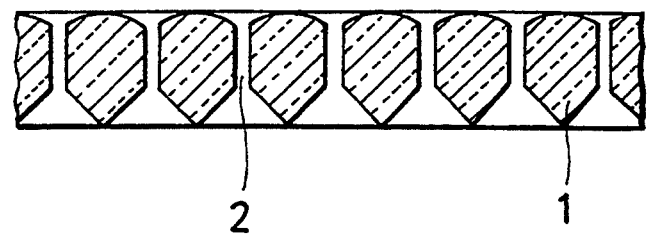

FIG. 1 is a constitutional drawing to illustrate a first embodiment of an image forming device according to the present invention. FIG. 2A and FIG. 2B are drawings to show a plan view and a cross-sectional view of FIG. 1, respectively. In the drawings, reference numeral 1 designates a roof prism lens pair, 1$a$ a lens portion, 1$b$ a roof prism portion, 2 a space portion, which is a portion unfilled with a resin, and 3 a rib. The image forming device comprises a lens array (LA) in which a plurality of lens portions 1$a$ are continuously formed, and a roof prism array (RPA) in which a plurality of roof prism portions 1$b$ each having a rectangular reflection plane are formed at the same pitch as the lens portions of the lens array. The lens array LA and the roof prism array (RPA) are integrally formed of a plastic. In the integrally-formed image forming device (roof prism lens array: RPLA), a space portion (resin-unfilled portion) 2 is formed between respective two adjacent roof prism lens pairs 1 of the roof prism lens array (RPLA).

A distance L between the lens portion and the prism portion is determined to satisfy the following relation as shown in FIG. 1:

$$L \leq 0.8(P-d),$$

where P is an arrangement pitch of the lenses and d a gap in the space portion. Setting the distance L to satisfy the above relation may effectively reduce and eliminate reflection light reflected only by a single surface of the reflection plane of the roof prism array (RPA), as will be referred to as single reflection light.

Figure 3A:
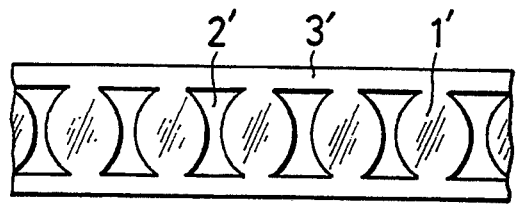
Figure 3B:
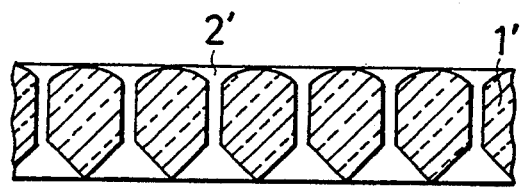

FIG. 3A and FIG. 3B are drawings to show a modification of the first embodiment of the image forming device according to the present invention. FIG. 3A is a plan view thereof and FIG. 3B a cross-sectional view thereof. In the present modification, a space portion (resin-unfilled portion) 2′ is formed between respective two adjacent roof prism lens pairs 1′ of the roof prism lens array (RPLA), and an opening shape of the lenses is made oval. A plurality of roof prism lens pairs 1′ are connected by a rib 3′. This arrangement permits a further improvement in imaging power.

Figure 4A:
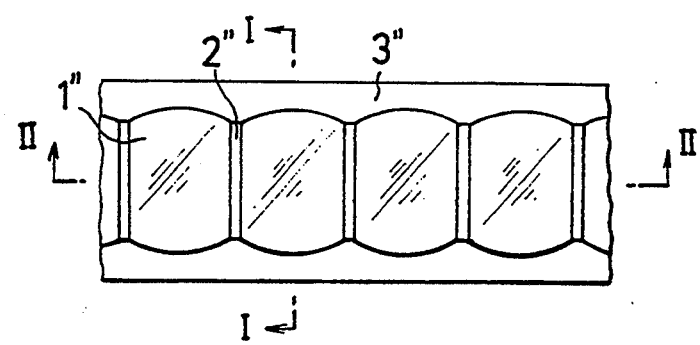
Figure 4B:
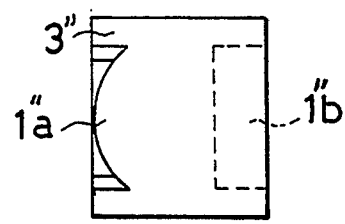
Figure 4C:
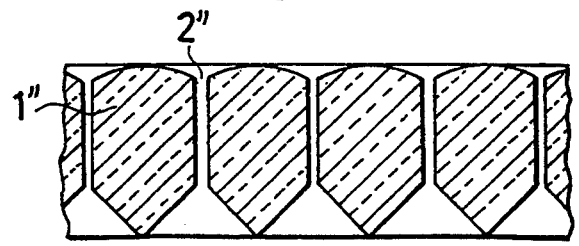

FIG. 4A, FIG. 4B, and FIG. 4C are drawings to show another modification of the first embodiment. FIG. 4A is a plan view thereof, FIG. 4B is a cross-sectional view along I—I line in FIG. 4A, and FIG. 4C is a cross-sectional view along II—II line in FIG. 4A. In the present modification, the opening shape of the lenses is of prolate ellipse. The arrangement excluding the opening shape is same as that of the first embodiment as shown in FIG. 1.

In the first embodiment and the modifications thereof, the space portion (resin-unfilled portion) is formed between respective two adjacent prism lens pairs of the roof prism lens array (RPLA), so that the crosstalk may be reduced between adjacent lenses thereby to improve the imaging power.

Figure 5:
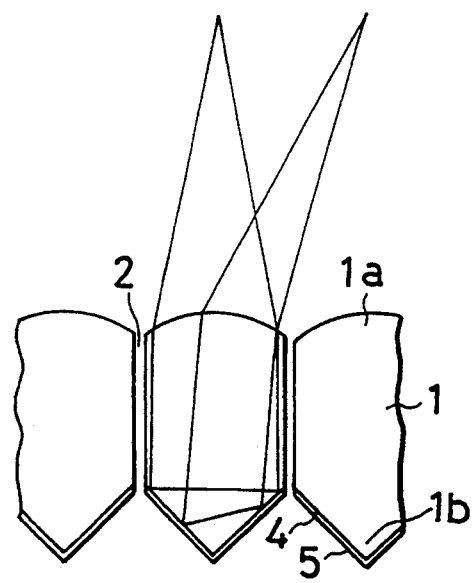
FIG. 5 is a drawing to show a second embodiment of the image forming device according to the present invention.

FIG. 5 is a drawing to show a second embodiment of the image forming device according to the present invention. In FIG. 5, numeral 4 denotes a reflection film, 5 a light shielding film, and the same numerals are given to elements having the same functions as in the first embodiment of FIG. 1. The image forming device comprises a lens array (LA) having a plurality of lens portions 1$a$ continuously formed and a roof prism array (RPA) having a plurality of roof prisms, each having a rectangular reflection plane, continuously formed at an arrangement pitch of the lens portions of the lens array. The lens array (LA) and the roof prism array (RPA) are integrally formed of a plastic. In the integrally-formed image forming device (roof prism lens array: RPLA), a space portion (resin-unfilled portion) 2 is formed between respective two adjacent roof prism lens pairs 1 of the roof prism array (RPLA). Further, a reflection film 4 is formed on a back face of the roof prism array (RPA), and a light shielding film 5 is overlaid on the reflection film 4.

The reflection film 4 may be readily formed in a known method such as the vacuum vapor deposition method and the sputtering method using a metal such as Al, Ag, or the like.

In the second embodiment, the space portion (resin-unfilled portion) is formed between respective two adjacent prism lens pairs of the roof prism lens array (RPLA), and the reflection film 4 and the light shielding film 5 are laminated on the back face of the roof prism array (RPA), so that the crosstalk may be further reduced between adjacent lenses thereby to improve the imaging power.

Figure 6A:
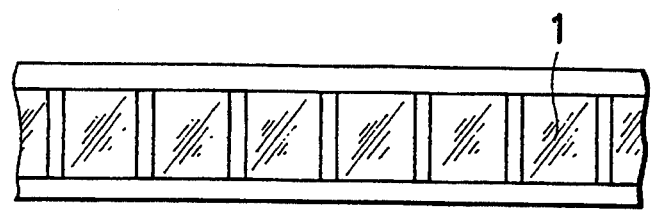
Figure 6B:
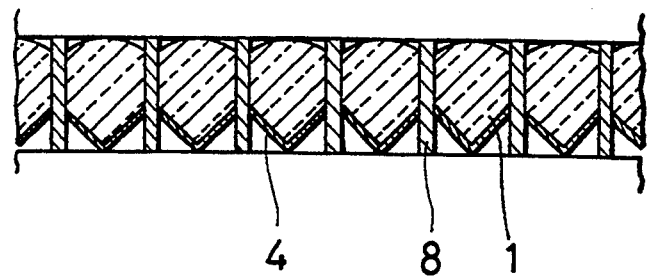

FIG. 6A and FIG. 6B are drawings to show a third embodiment of the image forming device according to the present invention. Elements having the same functions are given the same numerals as in the first embodiment as shown in FIG. 1. In FIGS. 6A and 6B, reference numeral 8 represents a light shielding member. A space portion (resin-unfilled portion) 2 is formed between respective two adjacent roof prism lens pairs 1 of the roof prism lens array (RPLA). Further, a reflection film 4 is formed on a back face of the roof prism array (RPA), and the light shielding member 8 is disposed in the space portion 2 between the roof prism lens pairs 1, whereby the crosstalk light between the lenses may be eliminated.

Figure 7:
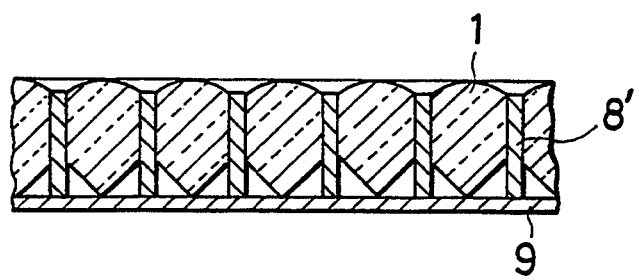
FIG. 7 is a drawing to show a modification of the third embodiment as shown in FIGS. 6A and 6B.
Figure 8:
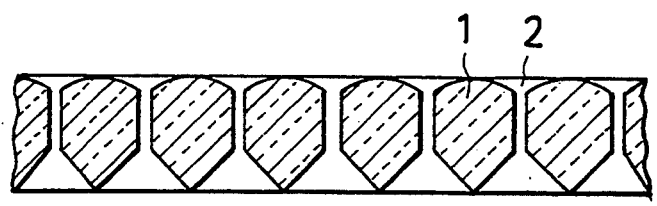
FIG. 8 is a drawing to show a first embodiment of a method for producing an image forming device according to the present invention.

FIG. 7 is a drawing to show a modification of the third embodiment of the present invention. In FIG. 7, numeral 9 denotes a light shielding member array. In the present modification, the light shielding member array 9 has a light shielding member 8' integral therewith. The other arrangement is same as that in the third embodiment. This modification makes assembly of the device easy.

In the third embodiment and the modification thereof, the space portion (resin-unfilled portion) is formed between the respective two adjacent prism lens pairs of the roof prism lens array (RPLA), and the light shielding member is disposed in the space portion, so that the crosstalk may be reduced between the adjacent lenses in such a simple method thereby to improve the imaging power.

FIG. 8, FIG. 9, FIG. 10A, and FIG. 10B are drawings to illustrate a first embodiment of a method for producing an image forming device according to the present invention. In the drawings, reference numeral 5 designates a light shielding film, 6 a container, and 7 a light shielding material. Elements having the same functions are given the same numerals as in the first embodiment of FIG. 1.

Figure 9:
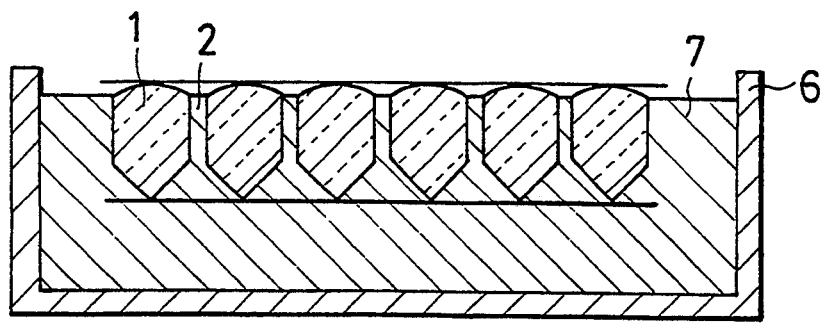
FIG. 9 is another drawing to show the first embodiment of the method for producing the image forming device.
Figure 10A:
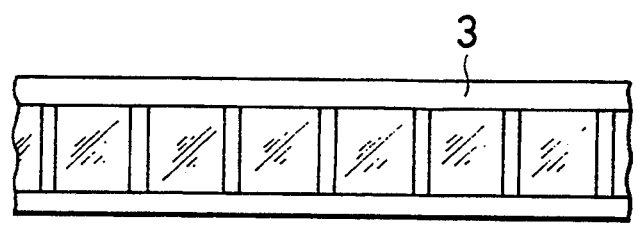
FIG. 10A and FIG. 10B are further drawings to show the first embodiment of the method for producing the image forming device.
Figure 10B:
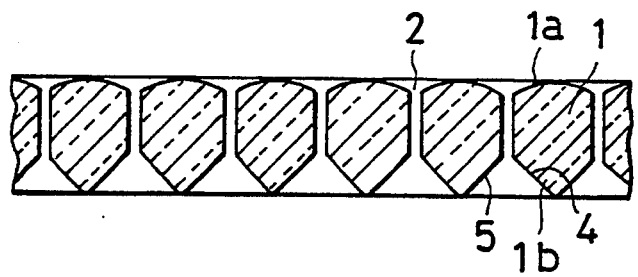

A first step is to integrally form of a plastic an image forming device (roof prism lens array: RPLA) comprising a lens array (LA) having a plurality of lenses continuously formed and a roof prism array (RPA) having a plurality of roof prisms each having a rectangular reflection plane and continuously formed at an arrangement pitch of the lens array. A space portion (resin-unfilled portion) 2 is formed between respective two adjacent roof prism lens pairs 1 of the roof prism lens array (RPLA). A reflection film 4 is then formed on a back face of the roof prism array (RPA) as shown in FIG. 9. The back face (opposite to the lenses) of the roof prism array of the roof prism lens array (RPLA) is brought into a liquid light shielding material 7 filling the container 6. The roof prism lens array (RPLA) is dipped into the material 7 on the roof prism array side to make the surface thereof colored. The roof prism lens array (RPLA) is dipped into the material down to a position next to a spherical portion (including an aspherical surface) of the surface of the lenses. After the dipping, the roof prism lens array (RPLA) is taken out of the material, and is then dried to form a light shielding film 5 as shown in FIGS. 10A and 10B. The light shielding film 5 may cover a circumference of the roof prism lens array (RPLA) as well as the space portion 2 between the roof prism lens pairs 1. This circumferential cover may shield external light incident into the roof prism lens array (RMLA), whereby degradation of the imaging power may be effectively prevented. Further, the circumferential cover permits omission of a case (housing) for shielding the external light, whereby the production cost may be reduced.

The light shielding material 7 may be a liquid in which a solute including a light absorbing material such as carbon is dispersed in a solvent which does not affect the properties of the plastic material used for the roof prism lens array (RPLA).

In the above method, the light shielding member may be simply made over the space portion (resin-unfilled portion) between the adjacent prism lens pairs of the roof prism lens array (RPLA), whereby the imaging power may be stabilized.

Next explained with FIGS. 11-23 are embodiments in which the light shielding means is provided in front of the lens array.

Figure 11:
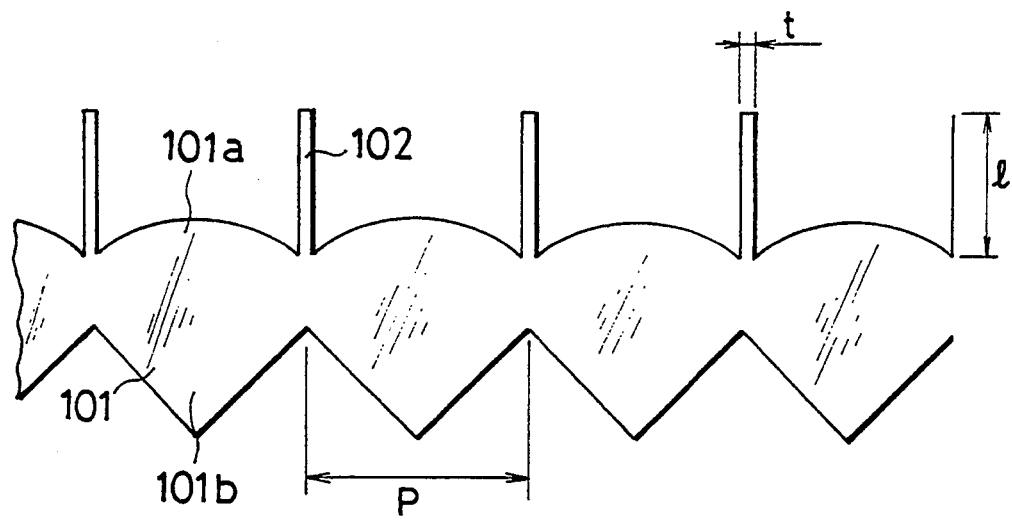
FIG. 11 is a constitutional drawing to illustrate a fourth embodiment of the image forming device according to the present invention.
Figure 12A:
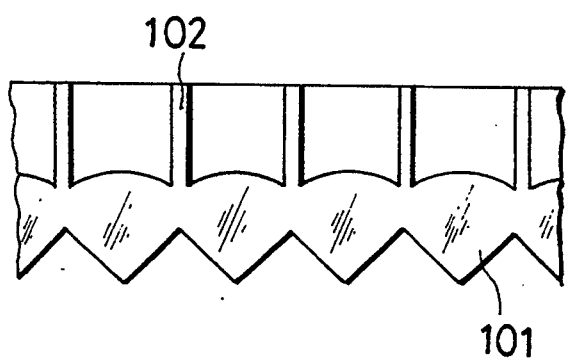
FIG. 12A and FIG. 12B are drawings to show a cross-sectional view and a plan view of the fourth embodiment as shown in FIG. 11, respectively.
Figure 12B:
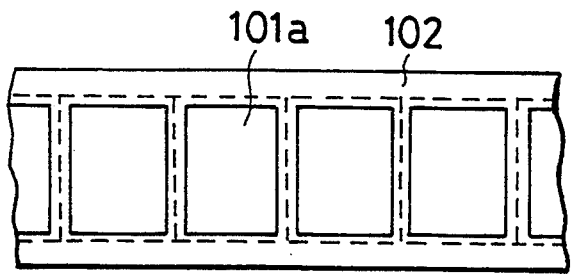

FIG. 11 is a constitutional drawing to illustrate a fourth embodiment of the image forming device according to the present invention. FIG. 12A and FIG. 12B are a cross-sectional view and a plan view of FIG. 11, respectively. In the drawings, reference numeral 101 denotes a roof prism lens pair and 102 a light shielding member.

The image forming device comprises a lens array (LA) having a plurality of lens portions 101a continuously formed and a roof prism array (RPA) having a plurality of roof prism portions 101b each having a rectangular reflection plane and continuously formed at an arrangement pitch of the lens array. The lens array (LA) and the roof prism array (RPA) are integrally formed of a plastic. In the integrally-formed image forming device (roof prism lens array: RPLA), the light shielding member 102 is also integrally formed with the roof prism lens array in front of the lens array (LA).

A length l of the light shielding member is determined to satisfy the following relation:

$$l \leq 0.8(P-t),$$

where P is the arrangement pitch of the lenses and t a thickness of the light shielding member. By determining the length l of the light shielding member to satisfy the relation, the single reflection light, which is reflection light reflected only by a single plane of the reflection plane of the roof prism array (RPA), may be effectively reduced and removed.

Figure 13A:
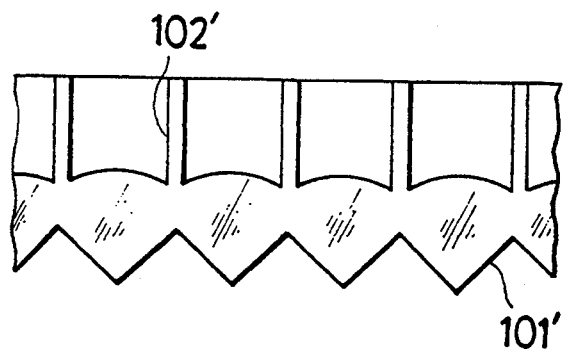
Figure 13B:
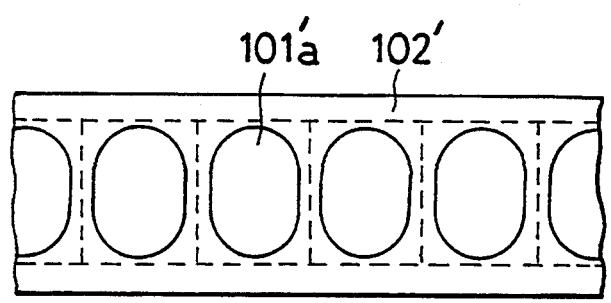

FIG. 13A and FIG. 13B are drawings to show a modification of the fourth embodiment as shown in FIG. 11. FIG. 13A is a cross-sectional side view thereof and FIG. 13B is a plan view thereof.

In the present modification, the opening shape 101a' of the light shielding member is made elliptic. The other arrangement is same as that in the fourth embodiment. The elliptic opening may eliminate a portion where the resolving power is lowered at a periphery of the lens, so that the imaging power may be improved and the light amount distribution may be readily adjusted.

Figure 14:
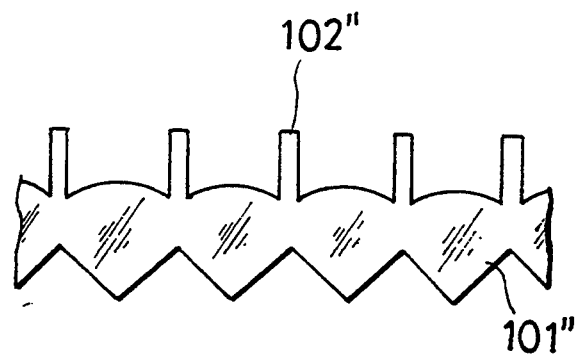
FIG. 14 is a drawing to show another modification of the fourth embodiment as shown in FIG. 11.

FIG. 14 is a drawing to show another modification of the fourth embodiment as shown in FIG. 11. In the present modification, a cross-section of the light shielding member 102" is of wedge, so that the light amount distribution may be readily adjusted and releasability of the device in molding may be improved. Also, the opening shape of the light shielding member is made elliptic.

The other arrangement is same as that in the fourth embodiment.

In the fourth embodiment and the modifications thereof, the light shielding member is integral with the roof prism lens array (RPLA) in front of the lens, so that the crosstalk may be reduced between the adjacent lenses and a position offset may be prevented between the roof prism lens array (RPLA) and the light shielding member, whereby the imaging power may be improved.

Figure 15:
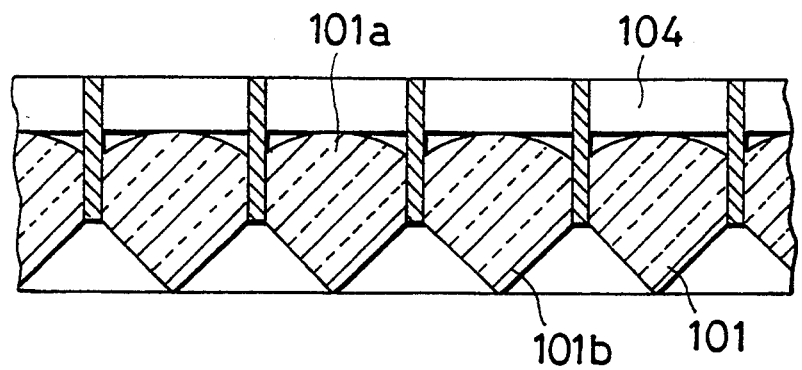
FIG. 15 is a cross-sectional view to show a fifth embodiment of the image forming device according to the present invention.
Figure 16:
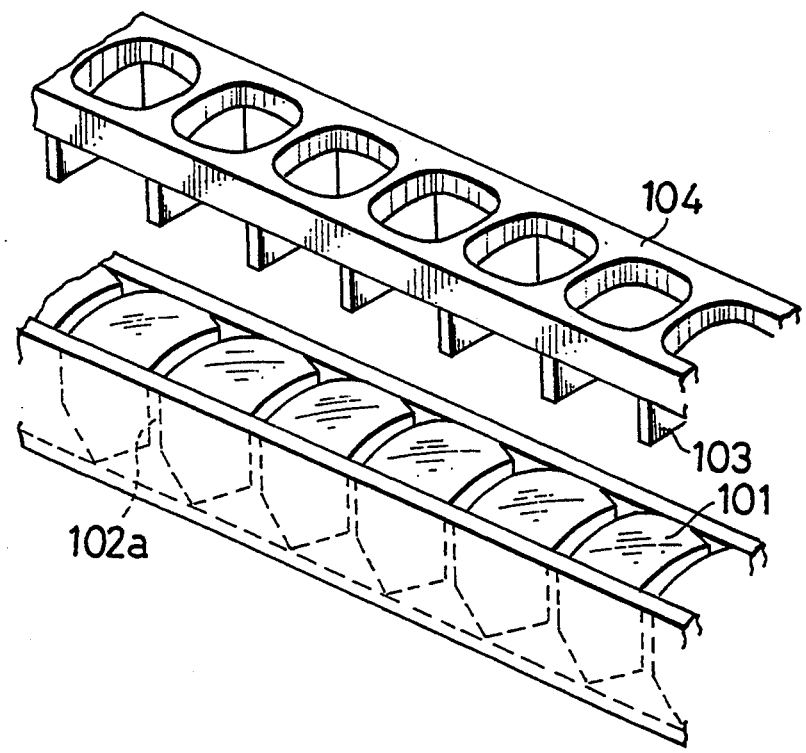
FIG. 16 is a perspective view before assembling of a combination of a light shielding member and a roof prism lens array in the fifth embodiment of the present invention.
Figure 17:
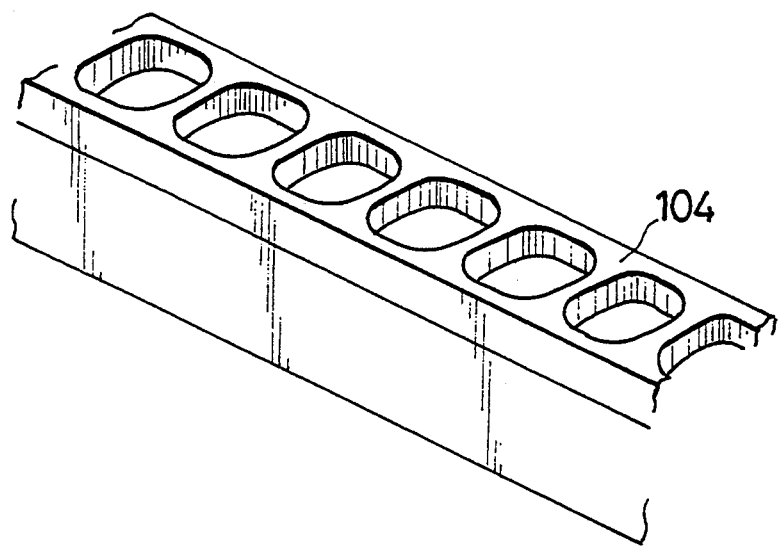
FIG. 17 is a perspective view after assembling of the combination in the fifth embodiment.

FIGS. 15-17 are drawings to show a fifth embodiment of the image forming device according to the present invention. FIG. 15 is a cross-sectional view, FIG. 16 is a constitutional drawing before assembling a combination of a light shielding plate and an aperture plate for a roof prism lens array, and FIG. 17 is a perspective view after assembling of the combination. In the drawings, numeral 102a denotes a space portion, 103 a light shielding plate, and 104 an aperture plate. Elements having the same functions are given the same numerals as in the fourth embodiment.

The image forming device comprises a lens array (LA) having a plurality of lens portions 101a continuously formed and a roof prism array (RPA) having a plurality of roof prism portions 101b each having a rectangular reflection plane and continuously formed at an arrangement pitch of the lens array. The lens array (LA) and the roof prism array (RPA) are integrally formed of a plastic. In the integrally-formed image forming device (roof prism lens array: RPLA), a space portion (resin-unfilled portion) 102a is formed between respective two adjacent roof prism lens pairs of the roof prism lens array (RPLA), a light shielding plate 103 is provided in the space portion 102a between the roof prism lens pairs, and an aperture plate 104 is disposed in front of the lens array. The light shielding plate 103 is integral with the aperture plate 104.

In the fifth embodiment, the light shielding plate 103 is placed in the space portion (resin-unfilled portion) 102a between the respective prism lens pairs 101 of the roof prism lens array (RPLA), and the aperture plate 104 integral with the light shielding plate 103 is disposed in front of the lens portions 101a, so that the crosstalk may be reduced between the adjacent lenses thereby to improve the imaging power. Further the light amount distribution may be optimized.

Figure 18:
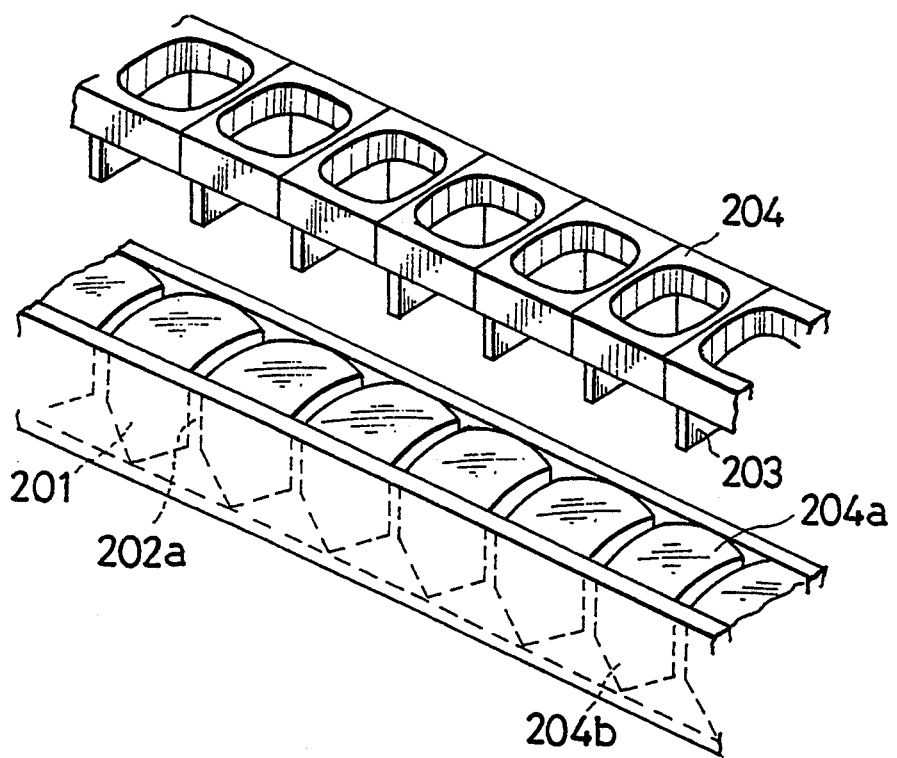
FIG. 18 is a perspective view before assembling to show a sixth embodiment of the image forming device according to the present invention.

FIG. 18 is a perspective view to show a sixth embodiment of the image forming device according to the present invention.

The image forming device comprises a lens array (LA) having a plurality of lens portions 204a continuously formed and a roof prism array (RPA) each having a rectangular reflection plane and continuously formed at an arrangement pitch of the lens array. The lens array (LA) and the roof prism array (RPA) are integrally formed of a plastic. In the integrally-formed image forming device (roof prism lens array: RPLA), a space portion (resin-unfilled portion) 202a is formed between respective two adjacent roof prism lens pairs 201 of the roof prism lens array (RPLA). Further, a light shielding plate 203 integral with an aperture plate 204 is provided for each roof prism lens pair 201. The light shielding plates 203 are provided in the space portions 202a between the roof prism lens pairs, and the aperture plates 204 are disposed in front of the lens portions. Light shielding members each comprised of a light shielding plate 203 and an aperture plate 204 integral with each other are aligned in front of the lens portions 204a.

Figure 19:
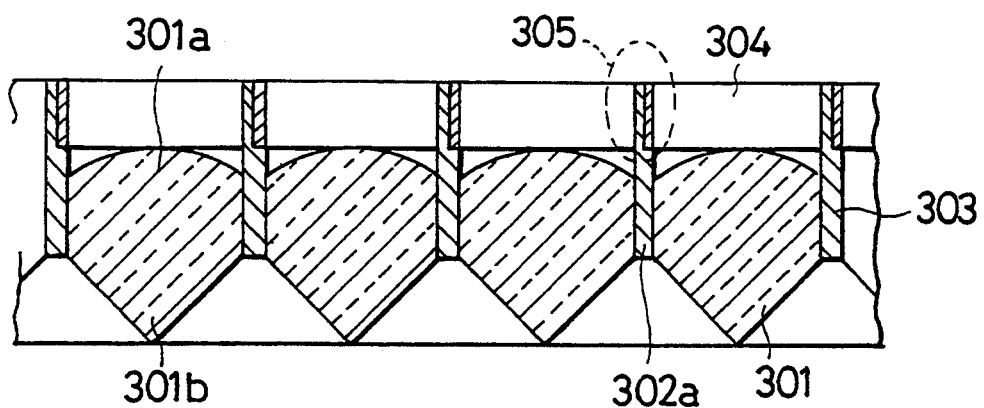
FIG. 19 is a cross-sectional view to show a seventh embodiment of the image forming device according to the present invention.
Figure 20:
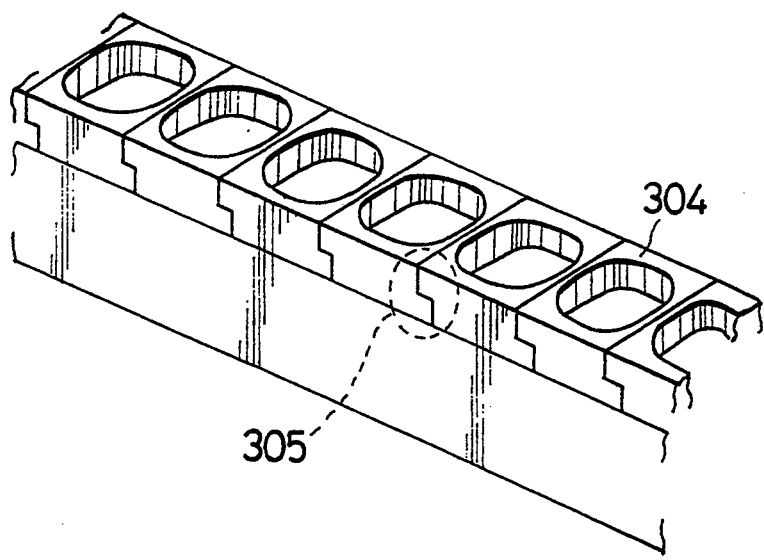
FIG. 20 is a perspective view of the seventh embodiment.

FIG. 19 and FIG. 20 are drawings to show a seventh embodiment of the image forming device according to the present invention. FIG. 19 is a cross-sectional side view thereof and FIG. 20 is a perspective view thereof. In the drawings, reference numeral 305 denotes a male-female coupling portion.

The image forming device comprises a lens array (LA) having a plurality of lens portions 301a continuously formed and a roof prism array (RPA) having a plurality of roof prism portions 301b each having a rectangular reflection plane and continuously formed at an arrangement pitch of the lens array. The lens array (LA) and the roof prism array (RPA) are integrally formed of a plastic. In the integrally-formed image forming device (roof prism lens array: RPLA), a space portion (resin-unfilled portion) 302a is formed between respective two adjacent roof prism lens pairs 301 of the roof prism lens array (RPLA). A light shielding member is provided for each lens. The light shielding member is comprised of a light shielding plate 303 and an aperture plate 304 integral with each other. The light shielding plate 303 is set in the space portion 302a between the roof prism lens pairs and the aperture plate is provided in front of the lens. A plurality of light shielding members each comprised of a light shielding plate 303 and an aperture plate 304 are connected to each other in the male-female coupling portions 305, and are disposed in front of the lens portions 301a. This connection through the male-female coupling may absorb a distribution of the entire length of the roof prism lens array (RPLA) due to machining errors thereof as well as extension and contraction due to an environmental change, because the light shielding members may slide to each other in the male-female coupling portions 305 to maintain the arrangement pitch of the opening portions of the aperture plates even. Further, the connection in the male-female coupling portions 305 may prevent light leakage between the light shielding plates and the aperture plates.

In the sixth and the seventh embodiments, the light shielding plates are provided in the space portions (resin-unfilled portions) between the adjacent prism lens pairs of the roof prism lens array (RPLA), so that the crosstalk may be reduced between the adjacent lenses thereby to improve the imaging power.

Also, the light shielding plate and the aperture plate are integral with each other and each pair thereof is provided for each lens, so that the arrangement pitch of the opening portions may be maintained even by absorbing the distribution of the entire length of the roof prism lens array (RPLA) due to machining errors thereof as well as extension and contraction thereof due to an environmental change, whereby local fluctuations in the light amount distribution may be effectively prevented.

Further, the light shielding members are connected in the male-female coupling portions of the aperture plates, and the light shielding members may slide upon change in entire length of the roof prism lens array (RPLA), so that the arrangement pitch of the opening portions of the aperture plates may be kept even and the light leakage may be effectively prevented between the light shielding plates and that the aperture plates by the connection in the male-female coupling portions.

Figure 21:
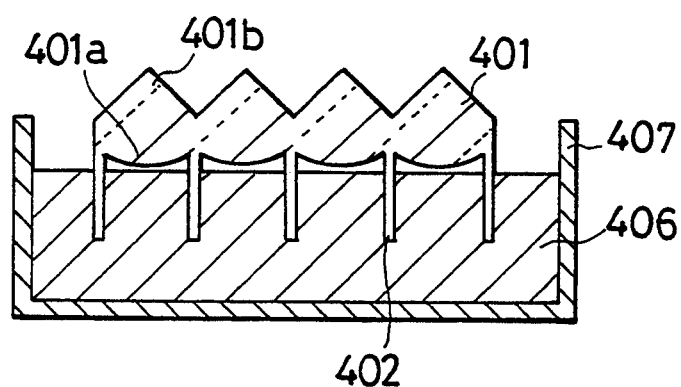
FIG. 21 is a drawing to show a second embodiment of the method for producing the image forming device according to the present invention.

FIG. 21 is a drawing to show a second embodiment of the method for producing the image forming device according to the present invention. In FIG. 21, numeral 406 designates a light shielding material and 407 a container thereof.

A first step is to integrally form of a plastic an image forming device (roof prism lens array: RPLA) comprised of a lens array (LA) having a plurality of lens portions 401a continuously formed and a roof prism array (RPA) having a plurality of roof prism portions 401b each having a rectangular reflection plane and continuously formed at an arrangement pitch of the lens array. Then, the roof prism lens array (RPLA) is brought into the light shielding material 406 of liquid filling in the container 407 in such a state that the back face of the roof prism array RPA is up. The roof prism lens array (RPLA) is dipped to make the surface of the light shielding member 402 colored. The roof prism lens array (RPLA) is dipped into the light shielding material 406 down to a position next to a spherical surface portion (including an aspherical plane) of the lenses. The roof prism lens array (RPLA) is then taken out of the light shielding material 406, and is dried to form a light shielding film thereon.

The light shielding material may be a liquid in which a solute including a light absorbing material such as carbon is dispersed in a solvent which does not affect the properties of the plastic material used for the roof prism lens array (RPLA).

In the second embodiment of the method for producing the image forming device, the light shielding film may be readily formed on the light shielding member integral with the roof prism lens array (RPLA), whereby the imaging power may be stabilized.

Figure 22:
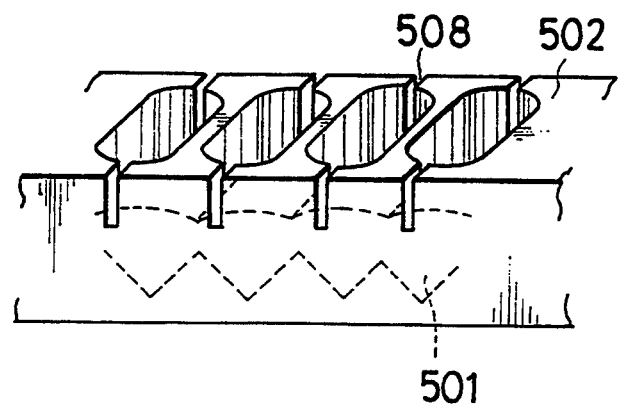
FIG. 22 is a perspective view to show an eighth embodiment of the image forming device according to the present invention.

FIG. 22 is a perspective view to show an eighth embodiment of the image forming device according to the present invention. In FIG. 22 numeral 508 denotes a slit.

An image forming device comprises a roof prism lens array (RPLA) 501 and a light shielding member 502 integrally formed of a plastic. Further, slits 508 are provided in portions of the light shielding member 502 as shown in FIG. 22. The slits 508 function as vent portions to remove air which remains in a space formed by the light shielding member 502 and the lens portions upon dipping to form the light shielding film in the method as shown in FIG. 21, and which could impede entrance of the light shielding material.

Figure 23:
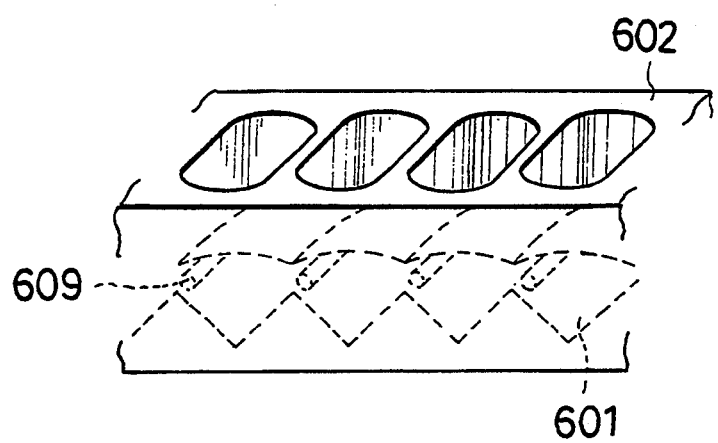
FIG. 23 is a perspective view to show a ninth embodiment of the image forming device according to the present invention.
Figure 24A:
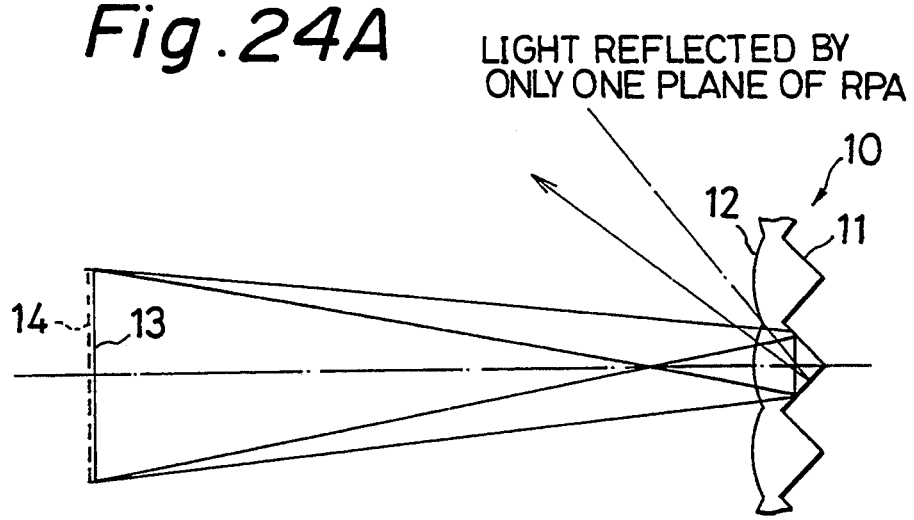
Figure 24B:
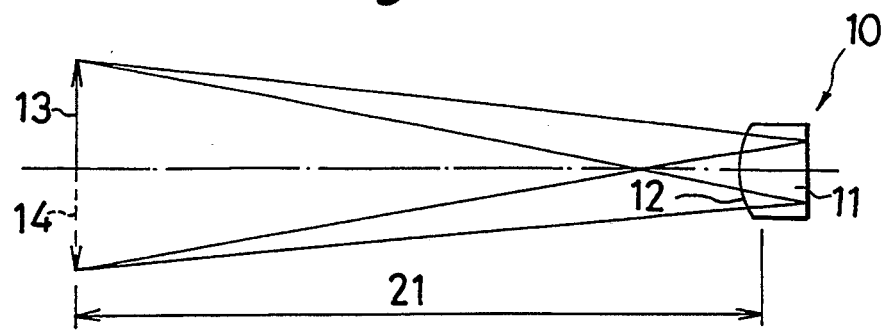
Figure 24C:
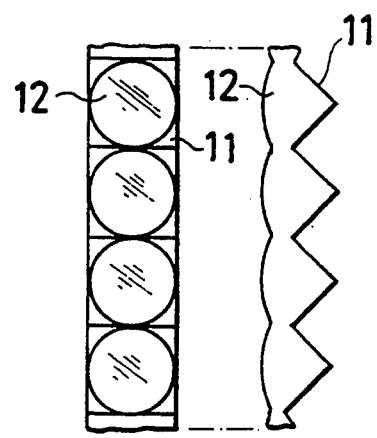
Figure 27:
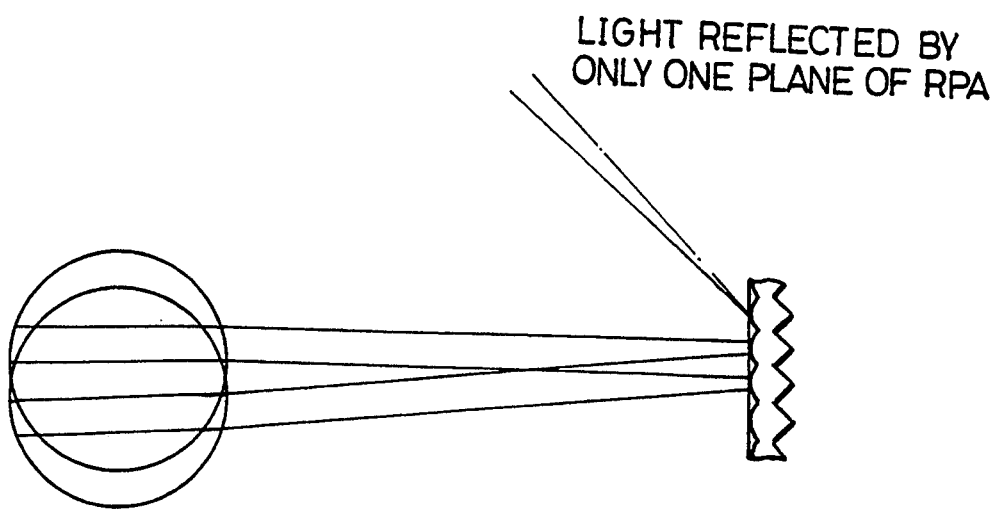
FIG. 27 is a drawing to show an overlap degree differing depending upon a prism opening shape.
Figure 28:
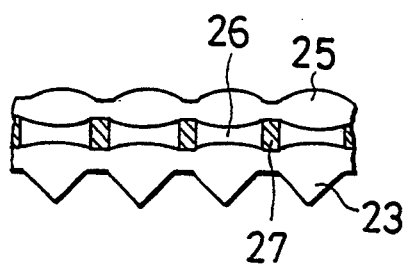
FIG. 28 is a drawing to show still another example of the conventional prism lens array.

FIG. 23 is a perspective view to show a ninth embodiment of the image forming device according to the present invention. In FIG. 23 numeral 609 designates a hole. The holes 609 are perforated through side walls of the light shielding member 602. The holes 609 are provided in the present embodiment instead of the slits 508 in FIG. 22. The holes 609 also function as vent portions similarly as the slits 508 in the eighth embodiment.

In the eighth and the ninth embodiments, the vent portions are formed in the light shielding member integral with the roof prism lens array (RPLA), whereby the light shielding material may be stably coated on the light shielding member in dip coating.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming device comprising:
  a lens array having a plurality of lenses continuously formed;
  a roof prism array having a plurality of roof prisms corresponding to said plurality of lenses in said lens array in one-to-one correspondence, each of said roof prisms having a rectangular reflection plane and defining a roof prism lens pair together with a corresponding lens;
  said lens array and said roof prism array being integrally formed of a plastic; and
  light shielding means disposed between respective two adjacent roof prism lens pairs to prevent crosstalk of light therebetween,
  said light shielding means being a space portion provided between respective two adjacent roof prism lens pairs.

2. An image forming device according to claim 1, wherein each roof prism of said roof prism array has a reflection film on a back of the reflection plane.

3. An image forming device according to claim 1, wherein said each roof prism lens pair has a plane on each side thereof connecting between the lens and the roof prism, two facing planes between two adjacent roof prism lens pairs defining the space portion.

4. An image forming device according to claim 3, wherein a light shielding film is formed on said planes.

5. An image forming device according to claim 1, wherein a light shielding member is provided in each space portion.

6. An image forming device according to claim 3, wherein a distance L of said planes satisfies the following relation:

$$L \leq 0.8 (P-d),$$

where P is an arrangement pitch of the roof prism lens pairs, and d is a thickness of the space portion.

7. An image forming device comprising:
  a lens array having a plurality of lenses continuously formed;
  a roof prism array having a plurality of roof prisms corresponding to said plurality of lenses in said lens array in one-to-one correspondence, each of said roof prisms having a rectangular reflection plane and defining a roof prism lens pair together with a corresponding lens;
  said lens array and said roof prism array being integrally formed of a plastic; and
  light shielding means disposed between respective two adjacent roof prism lens pairs to prevent crosstalk of light therebetween,
  said light shielding means being a light shielding member disposed between respective two adjacent roof prism lens pairs and in front of the lens array.

8. An image forming device according to claim 7, wherein said light shielding member is integrally formed together with the lens array and the roof prism array.

9. An image forming device according to claim 7, wherein a length l of the light shielding member satisfies the following relation:

$$l \leq 0.8 (P-d),$$

where P is an arrangement pitch of the roof prism lens pairs, and t is a thickness of the light shielding member.

10. An image forming device comprising:
  a lens array having a plurality of lenses continuously formed;

a roof prism array having a plurality of roof prisms corresponding to said plurality of lenses in said lens array in one-to-one correspondence, each of said roof prisms having a rectangular reflection plane and defining a roof prism lens pair together with a corresponding lens;

said lens array and said roof prism array being integrally formed of a plastic; and light shielding means disposed between respective two adjacent roof prism lens pairs to prevent crosstalk of light therebetween, said light shielding means being a light shielding member comprising a light shielding plate portion fit into the space portions disposed between respective two adjacent roof prism lens pairs and an aperture plate portion combining said light shielding plate portion while defining an opening shape of each lens in front of the lens array.

11. An image forming device according to claim 10, wherein said light shielding member is integrally formed.

12. An image forming device according to claim 10, wherein said light shielding plate portion and said aperture plate portion are provided for each roof prism lens pair, independent of other light shielding plate portions.

13. An image forming device according to claim 12, wherein adjacent aperture plate portions are connected by male-female coupling.

14. An image forming device comprising:

a lens array having a plurality of lenses continuously formed;

a roof prism array having a plurality of roof prisms corresponding to said plurality of lenses in said lens array in one-to-one correspondence, each of said roof prisms having a rectangular reflection plane and defining a roof prism lens pair together with a corresponding lens;

said lens array and said roof prism array being integrally formed of a plastic; and light shielding means disposed between respective two adjacent roof prism lens pairs to prevent crosstalk of light therebetween, an aperture shape of said lenses being rectangular.

15. An image forming device comprising:

a lens array having a plurality of roof prisms corresponding to said plurality of lenses in said lens array in one-to-one correspondence, each of said roof prisms having a rectangular reflection plane and defining a roof prism lens pair together with a corresponding lens;

said lens array and said roof prism array being integrally formed of a plastic; and light shielding means disposed between respective two adjacent roof prism lens pairs to prevent crosstalk of light therebetween, an aperture shape of said lenses being elliptic.

16. A method for producing an image forming device, comprising the steps of:

integrally forming an image forming device, said image forming device comprising a lens array having a plurality of lenses continuously formed, a roof prism array having a plurality of roof prisms corresponding to said plurality of lenses in said lens array in one-to-one correspondence, each of said roof prisms having a rectangular reflection plane and defining a roof prism lens pair together with a corresponding lens, and light shielding means disposed between respective two adjacent roof prism lens pairs to prevent crosstalk of light therebetween; and dipping the integrally-formed image forming device into a material for forming a light shielding film so as to form a light shielding film on the light shielding means.

17. A method according to claim 16, wherein said light shielding means of the image forming device is formed as a space portion between respective two adjacent roof prism lens pairs, and the integrally-formed image forming device is dipped into the light shielding film forming material on a side of the roof prism array.

18. A method according to claim 16, wherein said light shielding means of the image forming device is formed as a light shielding member in front of the lens array between respective two adjacent roof prism lens pairs, and the light shielding member of the integrally-formed image forming device is dipped into the light shielding film forming material.

19. A method according to claim 18, wherein vent means is formed in said light shielding member.

* * * * *